(12) United States Patent
Berjot et al.

(10) Patent No.: US 11,975,856 B2
(45) Date of Patent: May 7, 2024

(54) FRONT ENGINE ATTACHMENT SYSTEM FOR AN AIRCRAFT ENGINE, COMPRISING A MORE A LIGHTWEIGHT STRUCTURE

(71) Applicant: Airbus Operations SAS, Toulouse (FR)

(72) Inventors: Michael Berjot, Toulouse (FR); Jacky Puech, Toulouse (FR); Rémi Lansiaux, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 106 days.

(21) Appl. No.: 17/756,554

(22) PCT Filed: Nov. 16, 2020

(86) PCT No.: PCT/EP2020/082233
§ 371 (c)(1),
(2) Date: May 26, 2022

(87) PCT Pub. No.: WO2021/104913
PCT Pub. Date: Jun. 3, 2021

(65) Prior Publication Data
US 2022/0355946 A1    Nov. 10, 2022

Related U.S. Application Data

(60) Provisional application No. 62/941,428, filed on Nov. 27, 2019.

(30) Foreign Application Priority Data

Feb. 24, 2020 (FR) ..................................... 2001784

(51) Int. Cl.
*B64D 27/40*    (2024.01)
*B64D 27/18*    (2006.01)

(52) U.S. Cl.
CPC .............. *B64D 27/40* (2024.01); *B64D 27/18* (2013.01)

(58) Field of Classification Search
CPC .............. B64D 27/26; B64D 2027/262; B64D 2027/266; B64D 27/40; B64D 27/402;
(Continued)

(56) References Cited

U.S. PATENT DOCUMENTS 4,725,019 A * 2/1988 White ................... B64D 27/26
244/54
6,189,830 B1 * 2/2001 Schnelz ................ B64D 27/18
244/54
(Continued)

FOREIGN PATENT DOCUMENTS

FR    2891253 A1    3/2007
FR    3073205 A1    5/2019

OTHER PUBLICATIONS

International Search Report from corresponding PCT application No. PCT/EP2020/082233, mailed on Mar. 12, 2021.

*Primary Examiner* — Michael H Wang
*Assistant Examiner* — Colin Zohoori
(74) *Attorney, Agent, or Firm* — Greer, Burns & Crain, Ltd.

(57) ABSTRACT

A front engine attachment system for an engine of an aircraft. An engine pylon has a frontal rib with a front engine attachment with a first link rod which is fixed directly to the frontal rib by two connecting points. A second link rod is provided which has a first end fixed to the first link rod by a connecting point. The first link rod is fixed directly to an engine casing by at least two connecting points and a second end of the second link rod is fixed to the engine casing by a third connecting point. The first link rod may be made up (Continued)

of two adjoining plates that are fixed together. Also, an aircraft with such a front engine attachment system.

4 Claims, 6 Drawing Sheets

(58) Field of Classification Search
CPC ....... B64D 27/404; B64D 27/406; F02C 7/20; F01D 25/28
See application file for complete search history.

(56) References Cited

U.S. PATENT DOCUMENTS

| | | | |
|---|---|---|---|
| 11,572,184 B2* | 2/2023 | Deforet | B64D 27/404 |
| 2007/0138337 A1* | 6/2007 | Audart-Noel | B64D 27/26 244/53 R |
| 2008/0230675 A1 | 9/2008 | Audart-Noel et al. | |
| 2009/0032673 A1* | 2/2009 | Dron | B64D 27/40 248/557 |
| 2009/0108127 A1* | 4/2009 | Cazals | B64D 27/26 244/54 |
| 2021/0039799 A1* | 2/2021 | Sharma | F16F 9/52 |

* cited by examiner

FRONT ENGINE ATTACHMENT SYSTEM FOR AN AIRCRAFT ENGINE, COMPRISING A MORE A LIGHTWEIGHT STRUCTURE

RELATED APPLICATIONS

This application is a National Stage of International Application No. PCT/EP2020/082233, filed on Nov. 16, 2020, which in turn claims priority to U.S. Provisional Patent Application Ser. No. 62/941,428, filed Nov. 27 2019, and claims priority to French Patent Application No. 2,001,784, filed on Feb. 24, 2020, the entireties of all of which are incorporated herein by reference.

BACKGROUND

The present invention relates to a front engine attachment system for an aircraft engine, and to an aircraft having at least one such front engine attachment.

An aircraft conventionally has at least one engine, in particular a jet engine. Under each wing and for each engine, the aircraft has an engine pylon which is fixed to the structure of the wing and extends beneath the wing, and the engine is suspended under the engine pylon.

The engine is fixed to the engine pylon via an engine attachment system comprising a front engine attachment and a rear engine attachment.

Figure 8:
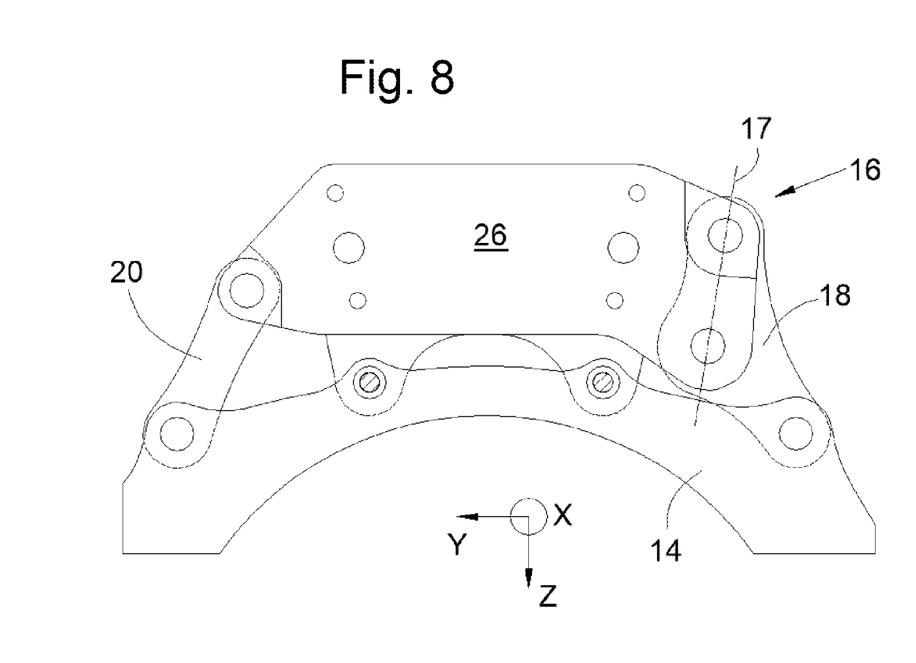
FIG. 8 is a front view of a front engine attachment system of the prior art.

FIG. 8 shows a front engine attachment 16 of the prior art, which has a beam 26 fixed to a front face of the engine pylon and two link rods 18 and 20 fixed between a clevis of the beam 26 and a clevis of the front casing 14 of the engine.

The beam 16 is often subject to movements between the engine and the engine pylon. Each link rod 18, 20 is equipped with ball joints which are made up of two cut-off and paired balls.

Each link rod 18, 20 and the beam 16 define, in combination, a primary load path between the engine and the engine pylon, so as to withstand the loads of the engine under normal operating conditions of said engine.

Such a beam 16 is a solid component obtained by machining a component obtained by forging. The method for obtaining this beam 16 is relatively lengthy and complex. Moreover, such a beam is wide and bulky and it is disposed in a relatively confined location on account of the significant integration with the engine in the assembled state.

While such a beam is satisfactory as far as its use is concerned, it is necessary to find a different architecture in order to make it easier to manufacture and employ and to compensate for the forces generated by the engine.

SUMMARY

An object of the present invention is to propose a front engine attachment system which has a first link rod fixed directly to a front face of the engine pylon and a second link rod fixed to the first link rod, wherein each link rod is also fixed to the engine, and wherein the first link rod has at least five connecting points.

To this end, there is proposed a front engine attachment system for an engine of an aircraft as described herein.

Such a front engine attachment system makes it possible to obtain an assembly that is more lightweight and easier to employ.

BRIEF DESCRIPTION OF THE DRAWINGS

The features of the invention that are mentioned above, and others, will become more clearly apparent from reading the following description of an exemplary embodiment, said description being given with reference to the appended drawings, in which.

DETAILED DESCRIPTION

Figure 1:
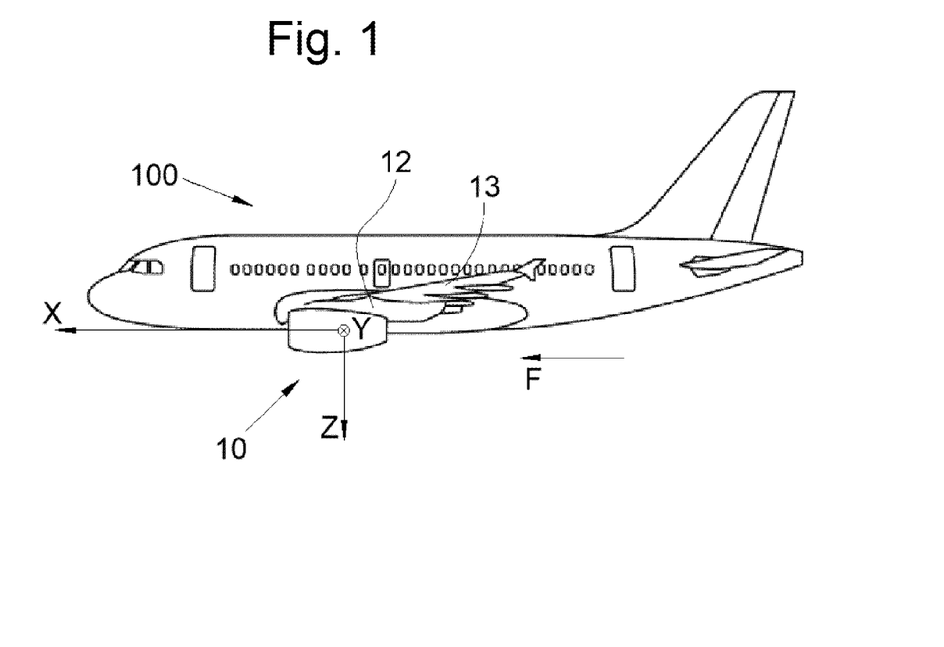
FIG. 1 is a side view of an aircraft according to the invention.

In the following description, terms relating to a position are considered in relation to an aircraft in a position of forward movement, i.e. as shown in FIG. 1, where the arrow F represents the direction of forward movement.

Figure 2:
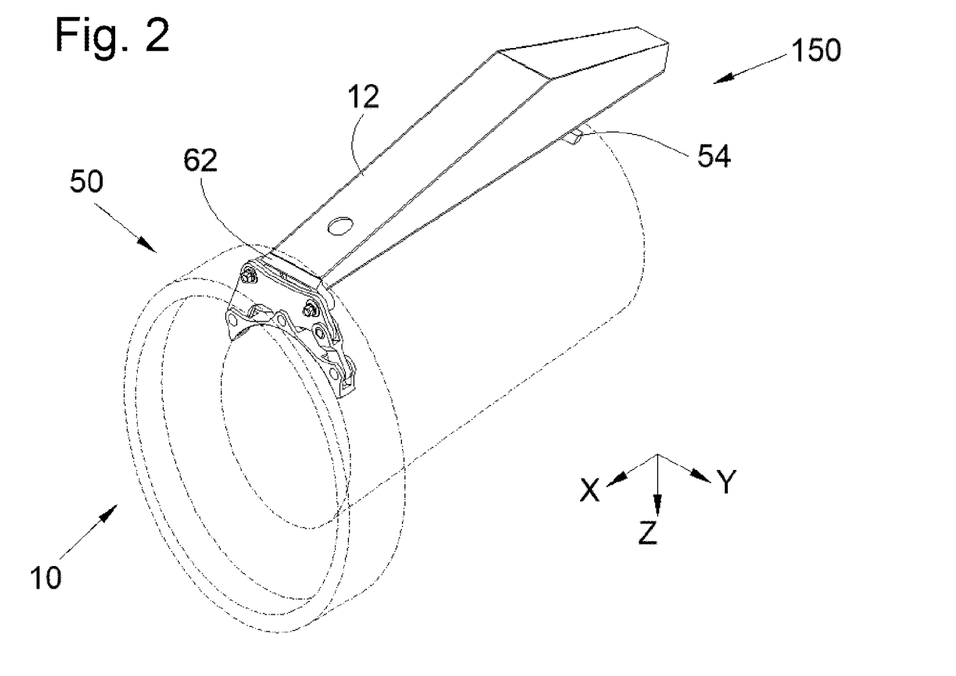
FIG. 2 is a perspective view of an aircraft engine pylon fixed between an engine and a structure of a wing.

FIG. 1 shows an aircraft 100 which has an engine 10, in particular a jet engine. FIG. 2 shows the engine 10 fixed under an engine pylon 12.

In the following description, and by convention, the X direction is the longitudinal direction of the engine 10, with positive orientation in the direction of forward movement of the aircraft 100, the Y direction is the transverse direction of the engine 10, which is horizontal when the aircraft 100 is on the ground, and the Z direction is the vertical direction or vertical height when the aircraft 100 is on the ground, these three directions X, Y and Z being mutually orthogonal.

The engine 10 has a shape exhibiting symmetry of revolution about the longitudinal axis X.

In the embodiment of the invention depicted in FIG. 1, the aircraft 100 has one engine 10 under each wing 13 of the aircraft 100, but it is possible to provide several engines under each wing 13.

Under each wing 13 and for each engine 10, the aircraft 100 has a front engine attachment system 150 which is fixed to the structure of the wing 13 and extends under the wing 13 and supports the engine 10, in particular the front part of the engine 10.

As shown in FIG. 2, the front engine attachment system 150 comprises the engine pylon 12 fixed to the wing 13 and a front engine attachment 50 fixed to the engine pylon 12 and a front casing 14 of the engine 10, which is shown as transparent here.

In the embodiment of the invention presented here, a rear engine attachment 54 is fixed between the engine pylon 12 and a rear part of the engine 10. This rear attachment 54 can be in any form known to a person skilled in the art.

In a known way, the engine pylon 12 is for example in the form of a box which has, inter alia, in its front part, a frontal rib 62 which extends in a substantially vertical plane.

Figure 3:
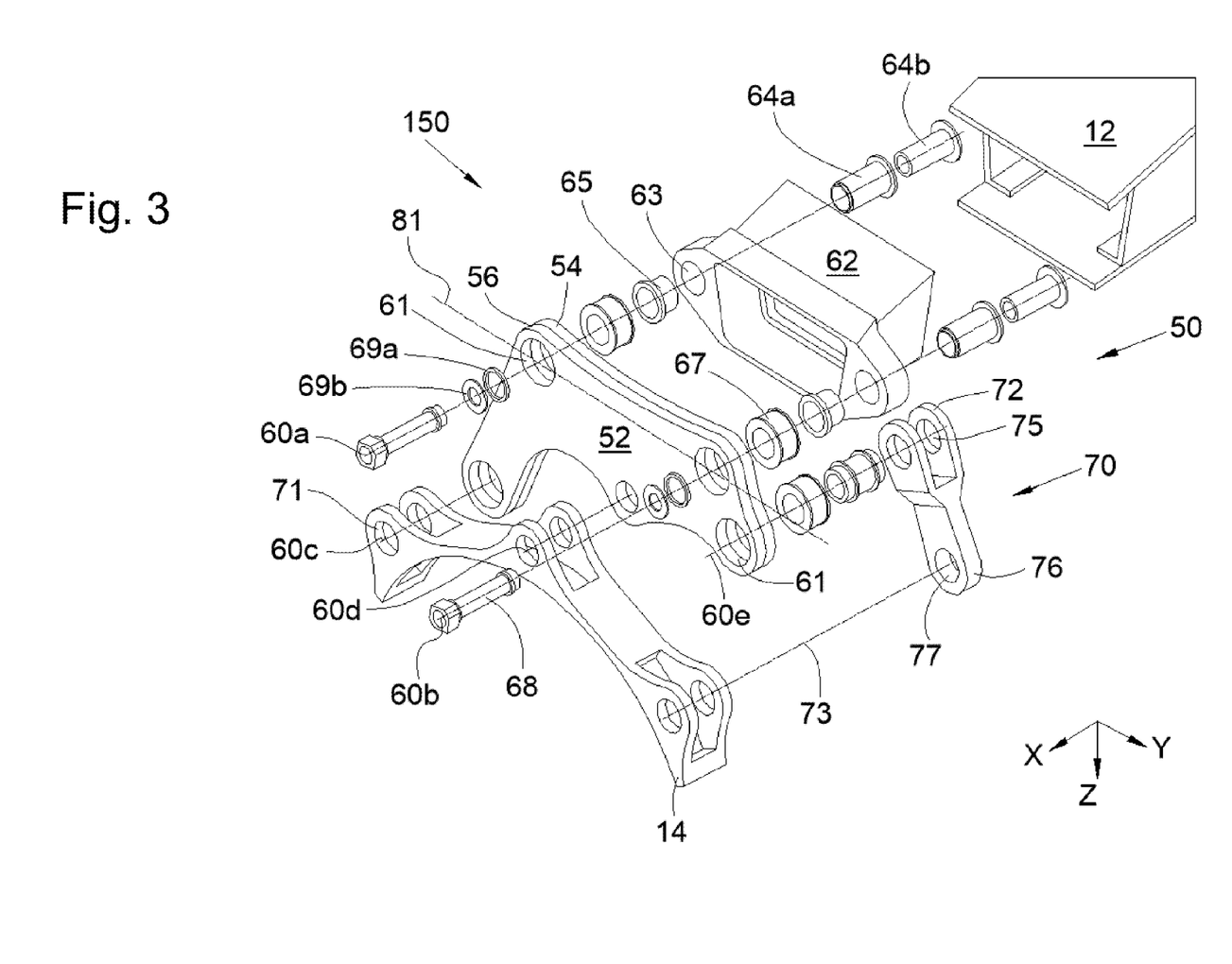
FIG. 3 is an exploded perspective view of a front engine attachment system according to the invention.
Figure 4:
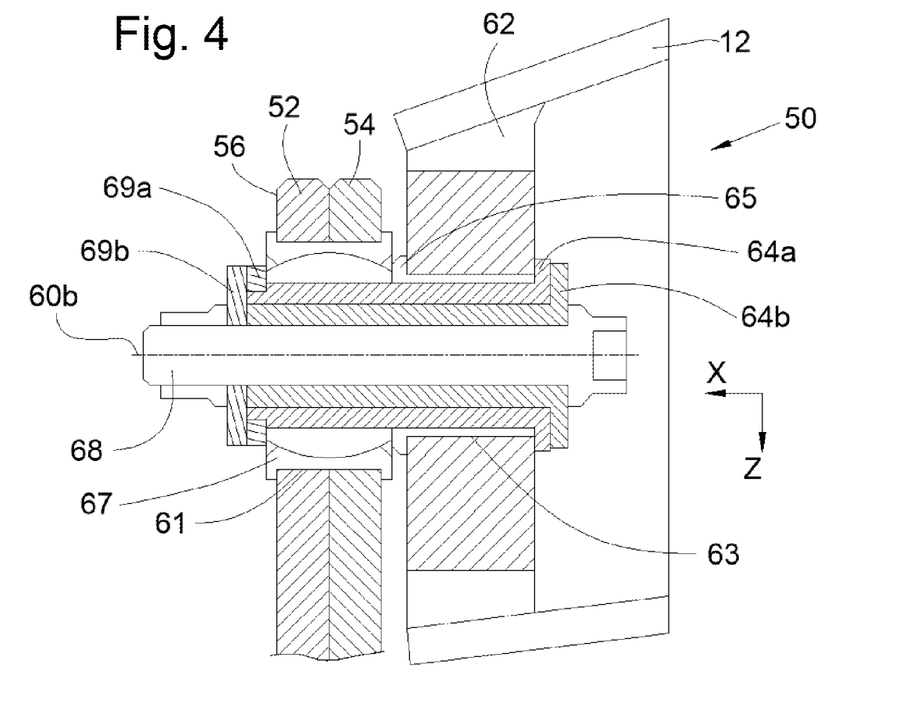
FIG. 4 is a cross-sectional view of a ball joint system at a connecting point.

FIG. 3 shows an exploded view of the front engine attachment 50, which is fixed between the frontal rib 62 and the engine casing 14 of the engine 10, and FIG. 4 shows a cross section of the assembled front engine attachment 50.

The front engine attachment 50 has a first link rod 56. The first link rod 56 is fixed in an articulated manner and directly to the frontal rib 62 by two connecting points 60*a-b*. The fixing at each connecting point 60*a-b* is ensured by fixing elements, one particular embodiment of which is described below and which are inserted into a bore 61 in the first link rod 56 and a bore 63 in the frontal rib 62.

Each connecting point 60*a-b* is in the form of a pivot connection about a pivot axis that is generally parallel to the longitudinal direction X, even if the placement of the two connecting points 60*a-b* between the first link rod 56 and the frontal rib 62 prevents the rotation of the first link rod 56 with respect to the frontal rib 62.

The first link rod 56 is also fixed in an articulated manner and directly to the engine casing 14 by at least two connecting points 60*c-d*. The fixing at each connecting point 60*c-d* is ensured by fixing elements which are not shown but which can be in the same form as the fixing elements described below. The fixing elements are inserted into a bore 61 in the first link rod 56 and a bore 71 in the engine casing 14.

Each connecting point 60*c-d* is in the form of a pivot connection about a pivot axis that is generally parallel to the longitudinal direction X, even if the placement of the two connecting points 60*c-d* between the first link rod 56 and the engine casing 14 prevents the rotation of the first link rod 56 with respect to the engine casing 14.

For each connecting point 60*c-d*, the engine casing 14 has a clevis in which the first link rod 56 is positioned. Thus, for each connecting point 60*c-d*, the bore 71 in the engine casing 14 is doubled.

The front engine attachment 50 has a second link rod 70, a first end 72 of which is fixed in an articulated manner to the first link rod 56 by a connecting point 60*e* and a second end 76 of which is fixed in an articulated manner to the engine casing 14 by a connecting point 73. Each connecting point 60*e*, 73 is in the form of a pivot connection about a pivot axis that is generally parallel to the longitudinal direction X. The second connecting point 60*d* for connecting the first link rod (56) and the engine casing (14) is arranged between the first connecting point 60*c* for connecting the first link rod (56) and the engine casing (14) and the connecting point 73 on the second end 76 of the second link rod 70. This allows the front engine attachment 50 to be compact in the Y-direction and to have a relatively light weight configuration.

The fixing at the connecting point 60*e* is ensured by fixing elements which are inserted into a bore 61 in the first link rod 56 and a bore 75 in the second link rod 70. In the embodiment of the invention presented here, the fixing elements are in the form of two bearings fitted one in the other and inserted into the bores 61 and 75 in the first link rod 56 and the second link rod 70.

The fixing at the connecting point 73 is ensured by fixing elements which are not depicted but which may be in the same form as the fixing elements described below. The fixing elements are inserted into a bore 77 in the second link rod 70 and a bore 71 in the engine casing 14.

In the embodiment in FIG. 3, the first end 72 of the second link rod 70 is in the form of a female clevis which receives the first link rod 56 and the second end 76 is in the form of a male element which is inserted into a female clevis of the engine casing 14. In this embodiment, the bore 75 in the first end 72 is doubled and the bore 71 in the engine casing 14 is doubled.

Figure 5:
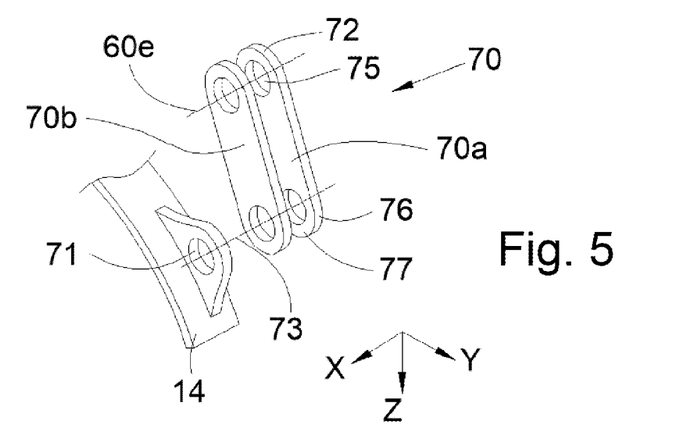
FIG. 5 is a perspective view of a variant for the second link rod.

FIG. 5 shows another embodiment, in which the second link rod 70 is made up of two connecting rods 70*a-b* which together form two female clevises in one of which the first link rod 56 is positioned and in the other of which the engine casing 14 is positioned. Each connecting rod 70*a-b* thus has a bore 75, 77 at each end.

Such a front engine attachment 50 with direct fixing of the first link rod 56 to the front rib 62 is thus less complex, less bulky and easier to manufacture than in the case of the prior art. Moreover, this assembly makes it possible to install the engine 10 by mounting the engine vertically.

In the embodiment of the invention presented here, the fixing elements comprise:
  a tension bolt 68 with a head integral with a threaded shank and a nut screwed onto the threaded shank,
  a secondary bearing 64*b* fitted on the threaded shank,
  a main bearing 64*a* fitted on the secondary bearing 64*b*,
  a first bearing 65 fitted on the main bearing 64*a* and inside the bore 63 in the frontal rib 62,
  a second bearing 67 fitted on the main bearing 64*a* and coming to bear against the first bearing 65 and inside the bore 61 in the first link rod 56,
  washers 69*a-b*, of which there are two here, which are fitted on the main bearing 64*a* and on the threaded shank, respectively.

The various bearings and washers are sandwiched between the head and the nut of the tension bolt 68. The fitting of a main bearing 64*a* and of a secondary bearing 64*b* makes it possible to ensure the operation of the assembly even in the event of failure of one of the two bearings 64*a-b*.

The second bearing 67 is in the form of a ball joint here.

Each bearing has a flange which allows it to butt against a fixed wall, in this case the frontal rib 62, and thus to be stopped from moving in translation.

The components of the fixing elements are all concentric with the pivot axis of the connecting point. Of course, a different arrangement of the fixing elements is possible.

The first link rod 56 is in this case made up of two adjoining plates 52 and 54 which are fixed to one another in order that, if one of the plates 52, 54 exhibits a defect, the other plate 54, 52 ensures safety. The plates 52 and 54 are made from flat, standard plates that do not require lengthy and complex machining as is the case for the prior art. Such an arrangement makes it possible to ensure safety in the event of failure (this also being referred to as a "fail-safe"). The fixing of the two plates 52 and 54 to one another is ensured for example by bolts.

The two plates 52 and 54 have the same arrangement of holes for providing the different connecting points 60*a-e*. Thus, in the event of failure of one of the five connecting points 60*a-e*, the forces caused by the engine 10 are transferred through the other connecting points 60*a-e*.

Figure 6A:
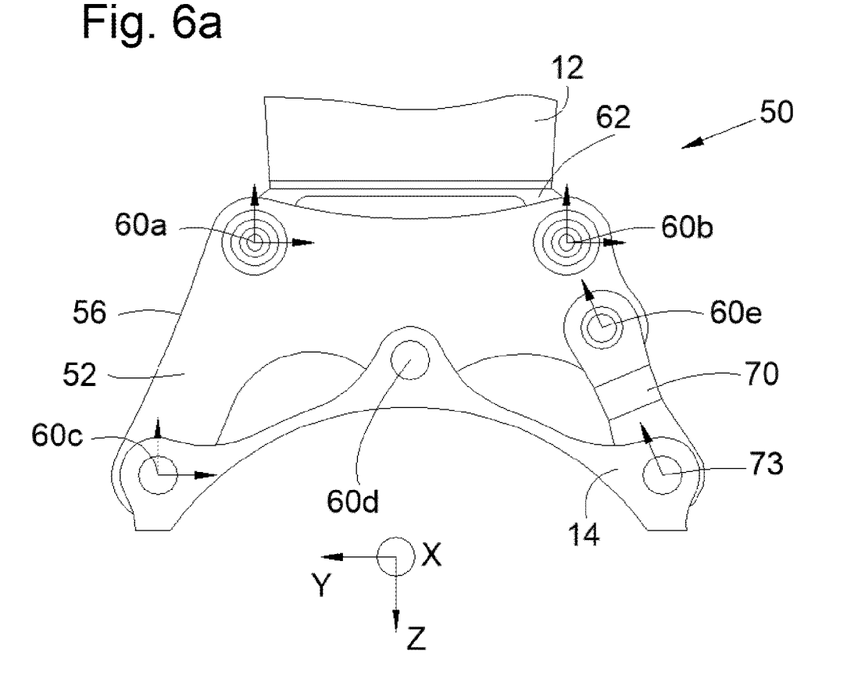
FIG. 6A is a front view of a front engine attachment system during normal operation.

FIG. 6A shows the distribution of the loads in normal operation of the front engine attachment 50. The connecting point 60*d* between the first link rod 56 and the engine casing 14 in this case constitutes a backup safety connecting point (or "waiting fail-safe") which will compensate for failure of the primary load path, that is to say of at least one of the link rods 56, 70.

Figure 6B:
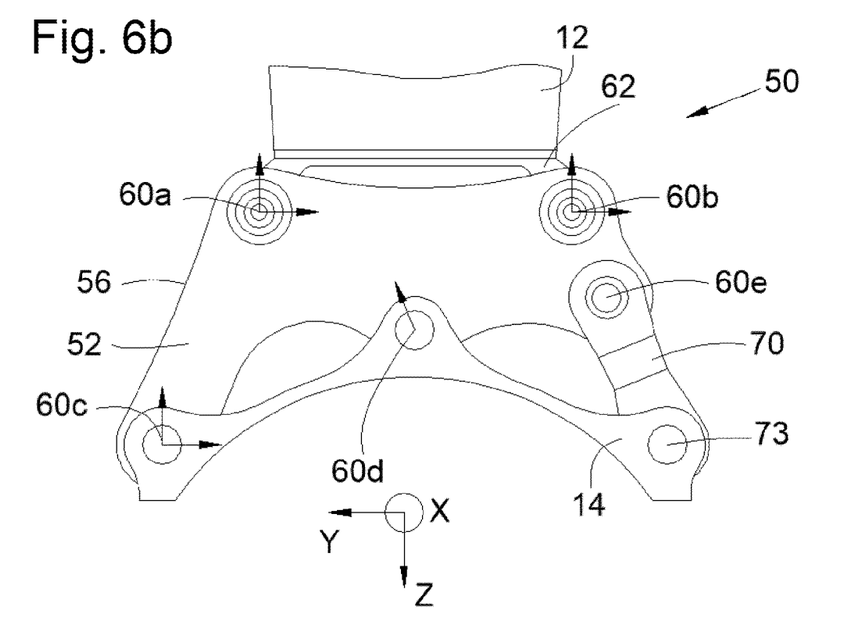
FIG. 6B is a view similar to FIG. 6A in the event of failure of the second link rod.

FIG. 6B shows the distribution of the loads in the event of failure of the second link rod 70 or of one of its connecting points 60*e*, 73. The loads are then transferred through the connecting point 60*d*.

Figure 6C:
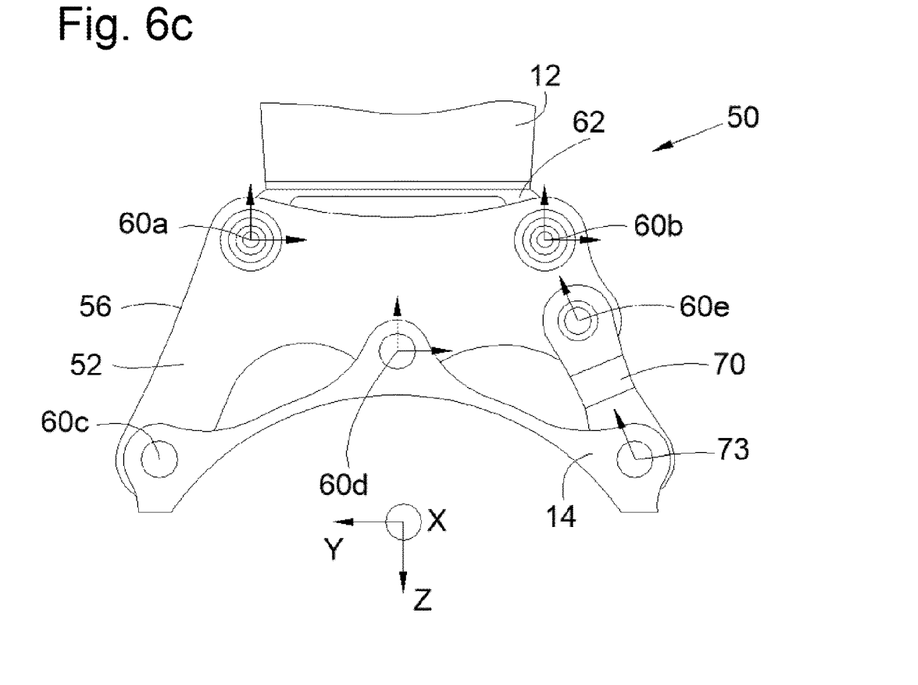
FIG. 6C is a view similar to FIG. 6A in the event of failure of the first link rod.

FIG. 6C shows the distribution of the loads in the event of failure of the first link rod 70 at its connecting point 60*c*. The loads are then transferred through the connecting point 60*d*.

Figure 7:
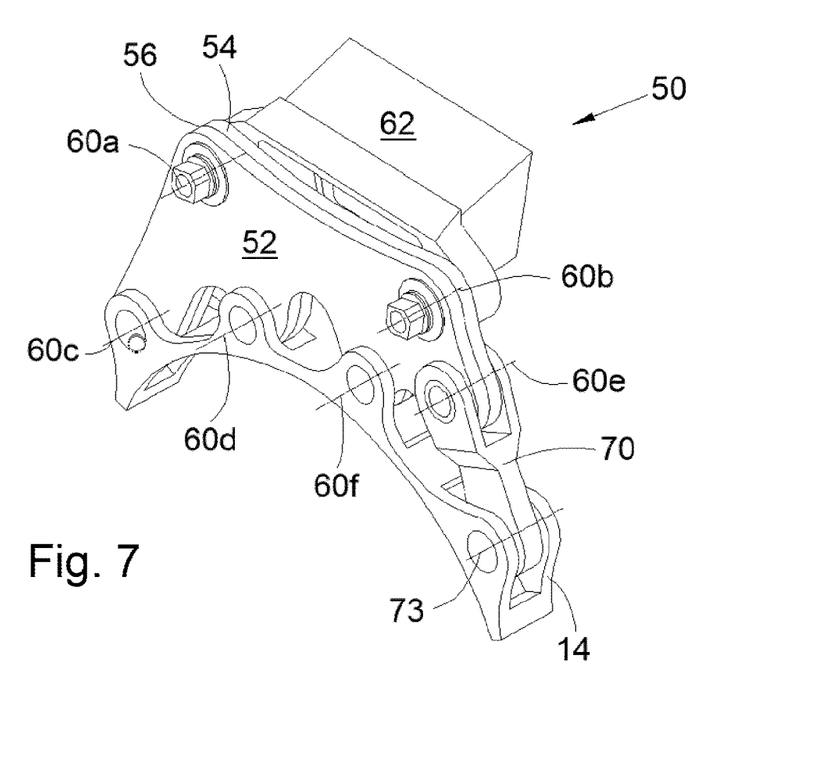
FIG. 7 is a perspective view of an embodiment variant.

FIG. 7 shows an embodiment in which the first link rod 56 has an additional connecting point 60f for providing an additional connection to the engine casing 14. Such an arrangement allows an increase in space in the Z direction by offsetting the connecting points 60d and 61f to port and starboard.

FIG. 3 also shows an axis of rotation 81 of the first link rod 56 relative to the front rib 62 and that axis passes through the axes of the two connecting points 60a-b between the first link rod 56 and the frontal rib 62 and is perpendicular to each of these two axes. This axis of rotation 81 is horizontal, meaning that the axes of said two connecting points 60a-b are at the same height. This axis of rotation 81 can be compared with the axis 17 of the prior art (FIG. 8), which is more vertical. This novel arrangement makes it possible to take the expansion of the engine 10 and the forces in the longitudinal direction X into account better.

The invention claimed is:

1. A front engine attachment system for an engine of an aircraft, the front engine attachment system comprising:
    an engine pylon having a frontal rib in a front part,
    a front engine attachment having
        a first link rod which is fixed, in an articulated manner, directly to the frontal rib by two connecting points, the first link rod being a monolithic piece and
        a second link rod having a first end which is fixed in an articulated manner to the first link rod by a connecting point, and
    an engine casing of the engine,
    wherein the first link rod is fixed, in an articulated manner, directly to the engine casing by a first connecting point and a second connecting point, the first connecting point is a laterally outermost connecting point between the front engine attachment and the engine casing,
    wherein a second end of the second link rod is fixed, in an articulated manner, to the engine casing by a third connecting point,
    wherein the second connecting point is arranged between the first connecting point and the third connecting point, and,
    wherein a rotational axis of the first link rod relative to the frontal rib passes through the two connecting points between the first link rod and the frontal rib, the rotation axis being horizontal.

2. The front engine attachment system of claim 1, wherein the first link rod comprises a first plate, the first plate joined to a second plate such that the first and second plates are fixed together.

3. An aircraft having a structure, the engine and the front engine attachment system according to claim 2, wherein the engine pylon is fixed to the structure, and wherein the engine casing is secured to the engine.

4. An aircraft having a structure, the engine and the front engine attachment system according to claim 1, wherein the engine pylon is fixed to the structure, and wherein the engine casing is secured to the engine.

* * * * *